Feb. 12, 1929.

J. BATCHELDER 1,701,715

ELECTRIC LOAD LIMITING DEVICE

Filed Feb. 15, 1928  3 Sheets-Sheet 1

INVENTOR:
James Batchelder
BY Cyrus W. Rice
ATTORNEY

Witness:

Feb. 12, 1929.

J. BATCHELDER 1,701,715

ELECTRIC LOAD LIMITING DEVICE

Filed Feb. 15, 1928     3 Sheets-Sheet 3

INVENTOR:
James Batchelder
BY Cyrus M. Rice
ATTORNEY

Witness:

Patented Feb. 12, 1929.

1,701,715

UNITED STATES PATENT OFFICE.

JAMES BATCHELDER, OF MUSKEGON HEIGHTS, MICHIGAN.

ELECTRIC LOAD-LIMITING DEVICE.

Application filed February 15, 1928. Serial No. 254,394.

The present invention relates to electric load limiting devices; and its object is, generally, to provide improved means for limiting the current or load carried by an electric line; and, more particularly, to provide means whereby such load may be uniformly limited at different periods of time; and, further and more specifically, to provide such devices improved in certain respects and having certain improved modes of operation hereinafter described.

It frequently occurs that the electric load or current constantly supplied by an electricity-generating plant to a number of consumers is used by some of them to a diminished extent at certain time periods—day or night for instance—so that other consumers at such periods are furnished with a heavier electric load than they then require. It is therefore the main object of this invention to provide improved means for automatically limiting such load at all times to the then needs of the individual consumer.

This and any other and more specific objects are attained by, the invention finds preferable embodiment in, the illustrative mechanical and electrical organization hereinafter particularly described in the body of this specification and illustrated by the accompanying drawings, in which:—

The main electric line 1 having suitable electricity-generating means (indicated by the battery 2) carries the electric load or current to the "work" (indicated at 3) to be performed thereby, which work may be of any suitable sort such, for instance, as a storage battery to be charged, an electric furnace for melting metal, etc. The electric load carried by this line 1 and going to said "work" is limited or controlled by the following mechanical and electrical organization.

Figure 1:
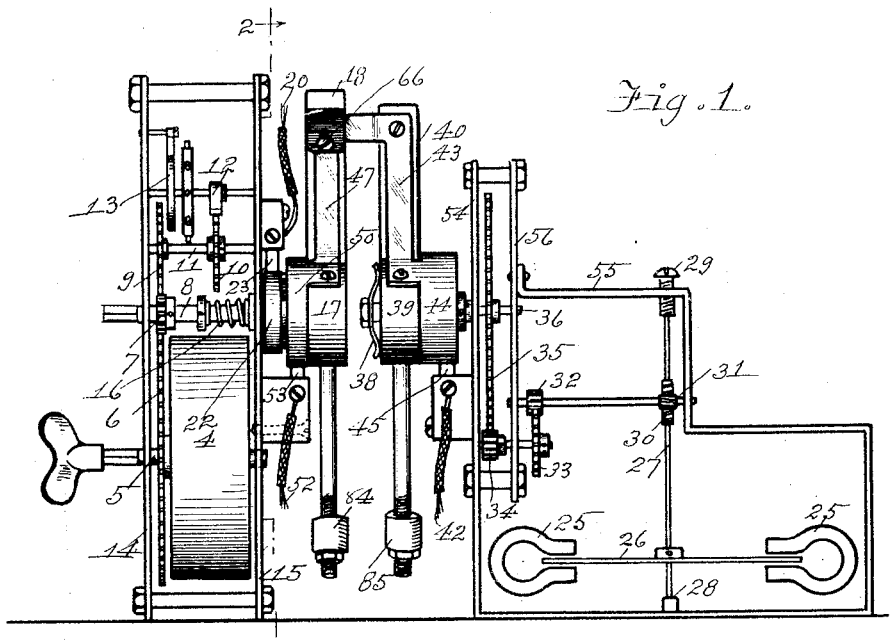
Figure 1 is a side view of portions of an electric load limiting device.
Figure 2:
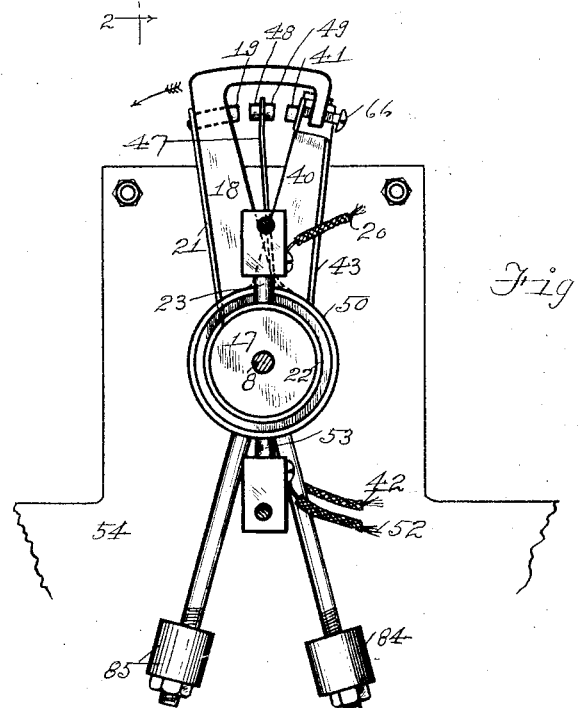
Figure 2 is a sectional view of portions thereof taken on line 2—2 of Figure 1.

Clockwork, shown at the left-hand side of Figure 1, comprises: A spiral clock spring 4 whose shaft 5 may be turned as by a key to wind the clockwork; a train of gears, 6 on said shaft and 7 on the driven shaft 8; time-regulating devices being the gear 9, escapement wheel 10 on the same shaft 11, escapement lever 12 engaging said wheel, and escapement-operating spiral spring 13; all these parts being mounted on and between the parallel plates 14, 15. Carried by the driven shaft 8 (frictionally by means of the spring 16) is a circular head 17 turning with said shaft anticlockwise, the clockwork being regulated to revolve said shaft 8 and head 17 in a predetermined time—for instance once in fifteen minutes. This head 17 has a radial arm 18 carrying an electric contact point 19 in an electric circuit 20 comprising the conductor 21 curled at its inner end 22 around said head and electrically contacting a brush indicated at 23 in said circuit 20. An electric metering or current controlling device is mounted in plates 54, 55, 56 adjacent the clockwork and comprises: The permanent magnets 25; the disc 26 rotating its shaft 27 bearing below at 28 and above in the adjusting screw 29 and having a worm 30 meshing with gear 31; a train of gears 32, 33, 34 and 35 on the driven shaft 36 which is coaxial with the driven shaft 8 of the clockwork and is rotatable anticlockwise by the electrical action of said metering or controlling device. Carried by this driven shaft 36 (frictionally by means of the spring 38) is a circular head 39 having a radial arm 40 carrying an electric contact point 41 in an electric circuit 42 comprising the conductor 43 curled at its inner end 44 around the head 39 and electrically contacta brush indicated at 45 connected to said circuit 42.

The clockwork's shaft's head 17 has a resilient radial conductor arm 47 angularly slightly spaced therefrom toward the arm 40 and carrying on its opposite sides contact points 48, 49. The inner end 50 of arm 47 is curled around the head 17, forming a part of an electric circuit 52 and contacting a brush indicated at 53 in said circuit 52.

The organization operates in the following manner: Normally, the conductor armature 60 (see Figure 4) contacts the contact points 61, 62 thus closing the main line 1 carrying the electric load or current to the "work" 3 through the portion $1^1$ of said main line and the portion $63^1$ of a variable resistance or rheostat 63. This main line has the coils 64 and the coil 65 in its branch $1^2$ through which coils the disk 26 and its shaft 27 are rotated in the usual manner, whereby the arm 40 is caused to rotate anticlockwise and behind the arms 18 and 47 of the clockwork.

In operation, the arm 40 follows behind the resilient arm 47 and is held from lagging too far behind it (although the rotation of the disk 26 may continue to decrease in speed) by the adjustable stop 66 carried by the clockwork's arm 18 which stop by engaging the arm 40 causes it to turn on its shaft 36 and thus keep pace with the timed rotation of arm 18. However much the rotation of disk 26 and shaft 36 may lag behind the rotative speed of the clockwork's driven shaft 8 and its arm 18, the arm 40 is nevertheless held at all times in so close proximity to the arms 18 and 47 as to quickly cause the load controlling or limiting device to operate as occasion may demand.

Figure 3:
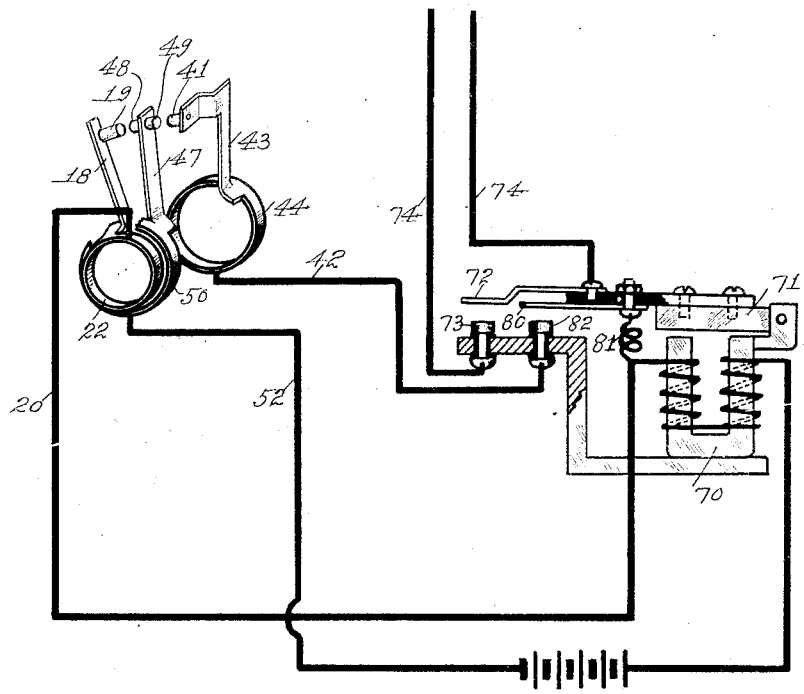
Figure 3 is a view of certain parts of the device, shown more or less diagrammatically and illustrating electric connections between the same.
Figure 4:
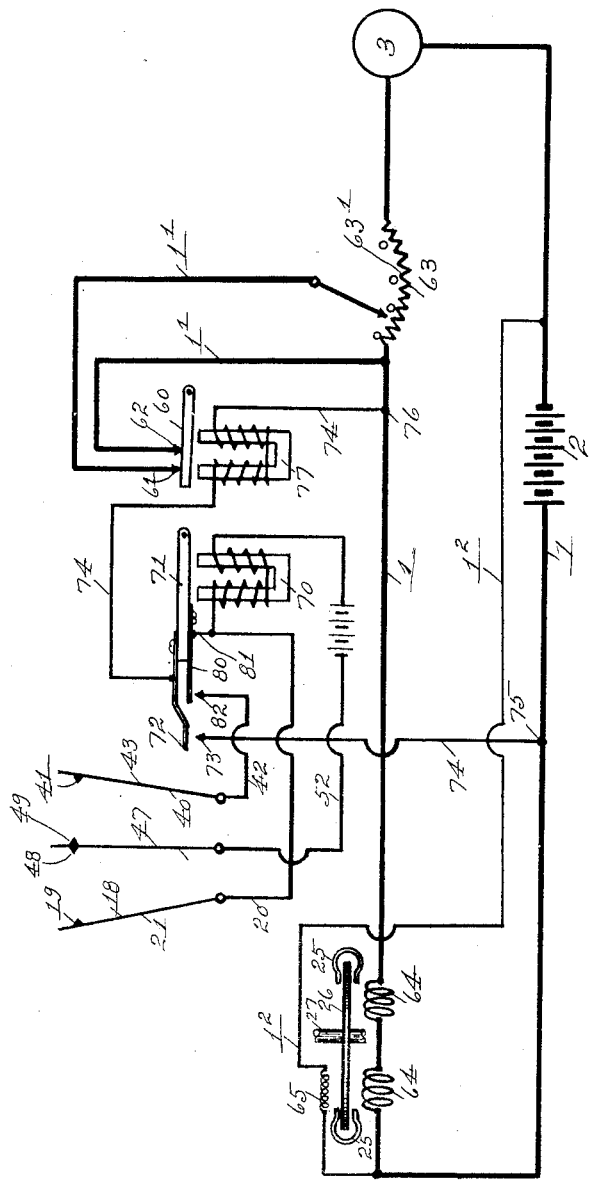
Figure 4 is a diagrammatic view showing electric connections between the parts of the device.

When the electric load or current going to the "work" 3 in main line 1 exceeds at any time the predetermined required amount, the disk 26 is thereby rotated more rapidly causing the arm 40 to move faster than the clockwork's shaft 8 and its arm 18 until the contact point 41 on arm 40 touches the contact point 49 on the resilient arm 47, and thereafter (by flexing this arm 47) the contact point 48 is made to touch the contact point 19 on arm 18 of the clockwork. The circuit 20, 52 is thus closed so that the electromagnet 70 therein is energized and attracts its armature 71 to cause its conductor 72 to touch the contact point 73 (see Figures 3 and 4) thus closing circuit 74 branching from the main line 1 at 75 and 76 as shown in Figure 4. This circuit 74 contains the electromagnet 77 which being energized attracts its armature conductor 60 thus separating the contact points 61, 62 and opening the portion 1¹ of the main line so that now the current must pass through the entire resistance interposed by the rheostat 63. The electric load or current going to the work is thus diminished to the predetermined required amount.

Slight diminutions of the electric load or current however do not cause the circuit (once established) through the entire resistance of the rheostat 63 to be broken, and slight variations of such load or current do not cause a fluctuating making and breaking of such circuit. This effect is brought about by the following means: When by a diminution of said load or current the arm 40 lags behind the movement of arm 18, the arm 47 by its resilience follows arm 40 for some distance. Thus the contact points 19 and 48 are suddenly separated, but the contact points 41, 49 remain in contact during such distance. Thus the circuit remains closed through the magnet 70 because its attraction of armature 71 has already caused its conductor 80 (connected by wire 81 with circuit 20, 52) to contact the contact point 82. The circuit through this magnet 70 therefore continues closed through the conductors 41, 49, 47, 52, 81, 80, 82, 42 and 43. This circuit through these conductors is a branch of circuit 20, 52 through said magnet, and that circuit 20, 52 being broken by the separation of contact points 19, 48, the said branch now carries the entire current which remains, in spite of such diminution, sufficient to energize magnet 70 until the load or current in the main line diminishes further and sufficiently to cause arm 40 to lag behind arm 47 far enough to separate contact points 41, 49.

The arms 18 and 40 are desirably counterbalanced adjustably as indicated at 84 and 85.

The invention being intended to be pointed out in the claims, is not to be limited to or by details of construction and arrangement of the particular embodiment thereof illustrated by the drawings or hereinbefore described.

I claim:

1. The combination of a load circuit, a resistance in series with said circuit, a shunt circuit normally shorting a portion of said resistance, a normally closed switch for opening said shunt circuit, a pair of rotatable switch arms angularly spaced and electrically insulated from each other, time controlled mechanism for rotating said arms in unison, a third switch arm co-axially rotatable with said first-mentioned arms, and normally spaced rearwardly with respect to the direction of rotation of said time controlled arms, load operated means for rotating said third switch arm so as to normally lag behind said time controlled arms, and to make contact with said arms upon an increase in said load circuit, a control circuit closed by said switch arms and means energized by said control circuit for opening said shunt circuit switch.

2. The combination of a load circuit, a resistance in series with said circuit, a shunt circuit normally shorting a portion of said resistance, a normally closed switch for opening said shunt circuit, a pair of rotatable switch arms angularly spaced and electrically insulated from each other, time controlled mechahism for rotating said arms in unison, a third switch arm co-axially rotatable with said first-mentioned arms, and normally spaced rearwardly with respect to the direction of rotation of said time controlled arms, an electric motor driven by said load circuit at a speed proportionate to the current load in said circuit for rotating said third switch arm so as to normally lag behind said time controlled arms, and to make contact with said arms upon an increase in said load circuit, a control circuit closed by said switch arms and means energized by said control circuit for opening said shunt circuit switch.

3. The combination of a load circuit, a resistance in series with said circuit, a shunt circuit normally shorting a portion of said resistance, a normally closed switch for opening said shunt circuit, a pair of rotatable switch arms angularly spaced and electrically insulated from each other, time controlled mechanism for rotating said arms in unison, a third switch arm co-axially rotatable with said first-mentioned arms, and normally spaced rearwardly with respect to the direction of rotation of said time controlled arms, load operated means for rotating said third switch arm so as to normally lag behind said time controlled arms, and to make contact with said arms upon an increase in said load circuit, said third switch arm upon accelerated movement first contacting with one of said arms and then upon further accelerated movement contacting with both of said arms, a control circuit closed by said first pair of switch arms, means actuated by the closing of said control circuit for opening said shunt circuit switch and for establishing a holding circuit through said third switch arm for maintaining said shunt circuit switch in open position until said third switch arm lags sufficiently to open said holding circuit.

In testimony whereof I have hereunto set my hand at Grand Rapids, Michigan, this 11th day of February, 1928.

JAMES BATCHELDER.